(12) United States Patent
Zandbergen et al.

(10) Patent No.: US 9,643,464 B2
(45) Date of Patent: May 9, 2017

(54) WHEEL SUSPENSION AND AXLE INCLUDING WHEEL SUSPENSION FOR A MOTOR VEHICLE

(71) Applicant: FORD GLOBAL TECHNOLOGIES, LLC, Dearborn, MI (US)

(72) Inventors: Paul Zandbergen, Plombieres (BE); Albert Girelli Consolaro, Aachen (DE); Daniel Mainz, Herzogenrath (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/669,770

(22) Filed: Mar. 26, 2015

(65) Prior Publication Data

US 2015/0273963 A1 Oct. 1, 2015

(30) Foreign Application Priority Data

Mar. 26, 2014 (DE) ........................ 10 2014 205 632

(51) Int. Cl.
*B60G 3/20* (2006.01)
*B60G 11/08* (2006.01)
(Continued)

(52) U.S. Cl.
CPC ................ *B60G 3/20* (2013.01); *B60G 11/08* (2013.01); *B60G 11/113* (2013.01);
(Continued)

(58) Field of Classification Search
CPC ...... B60G 3/20; B60G 11/113; B60G 13/005; B60G 11/08; B60G 2200/18; B60G 2204/121; B60G 2202/114
See application file for complete search history.

(56) References Cited

U.S. PATENT DOCUMENTS 1,546,711 A 7/1923 Brock
1,491,714 A 4/1924 Lowe
(Continued)

FOREIGN PATENT DOCUMENTS

DE 197 21 878 A1 12/1998
DE 601 19 216 T2 2/2007
(Continued)

OTHER PUBLICATIONS

Examination Report dated Apr. 6, 2014 issued in corresponding German application No. 10 2013 210 338.7.
(Continued)

*Primary Examiner* — Darlene P Condra
(74) *Attorney, Agent, or Firm* — Jones Robb, PLLC; Raymond L. Coppiellie

(57) ABSTRACT

A single wheel suspension is provided for a rear axle of a vehicle. The single wheel suspension may have a transverse leaf spring, a damper, and a wheel carrier. The wheel carrier can be connected to the vehicle via a transverse link connected to the wheel carrier in an articulated manner. The wheel carrier can be further connected to the vehicle via a tie rod. The transverse links may include a carrier link and a camber link. The carrier link may be connected to the wheel carrier via two connections, with the transverse leaf spring being coupled in an articulated manner to one of the transverse links or wheel carrier via a connection element, which permits relative movement between the leaf spring and the transverse link or wheel carrier the leaf spring is coupled to.

18 Claims, 4 Drawing Sheets

(51) Int. Cl.
    *B60G 11/113*        (2006.01)
    *B60G 13/00*         (2006.01)
(52) U.S. Cl.
    CPC ........ *B60G 13/005* (2013.01); *B60G 2200/18* (2013.01); *B60G 2202/114* (2013.01); *B60G 2204/121* (2013.01)

(56) References Cited

U.S. PATENT DOCUMENTS

| | | | |
|---|---|---|---|
| 1,509,618 A | 9/1924 | Sorensen et al. | |
| 2,018,653 A | 10/1935 | Best | |
| 2,186,065 A * | 1/1940 | Fischer | B60G 11/14 267/249 |
| 3,426,862 A * | 2/1969 | Wilfert | B60G 3/24 180/362 |
| 3,883,152 A | 5/1975 | De Carbon | |
| 4,458,918 A | 7/1984 | Rumpel | |
| 5,016,861 A | 5/1991 | Thompson et al. | |
| 5,046,753 A | 9/1991 | Giovanni | |
| 5,364,114 A * | 11/1994 | Petersen | B60G 3/20 267/248 |
| 5,722,673 A * | 3/1998 | Mauz | B60G 3/20 280/124.132 |
| 5,833,026 A * | 11/1998 | Zetterstrom | B60G 3/202 180/360 |
| 6,029,987 A | 2/2000 | Hoffman et al. | |
| 6,357,772 B1 | 3/2002 | Pelz et al. | |
| 6,457,729 B2 | 10/2002 | Stenvall | |
| 6,588,779 B2 | 7/2003 | Sandahl et al. | |
| 7,029,017 B2 | 4/2006 | Zandbergen et al. | |
| 7,784,806 B2 | 8/2010 | Schmidt et al. | |
| 8,205,900 B1 * | 6/2012 | Moravy | B60G 3/20 280/124.138 |
| 8,267,416 B2 | 9/2012 | Allen et al. | |
| 8,360,452 B2 * | 1/2013 | Kettenberger | B60G 7/02 280/124.14 |
| 8,585,068 B2 * | 11/2013 | Schlangen | B60G 3/20 180/357 |
| 2004/0090032 A1 * | 5/2004 | Raleigh | B60G 11/04 280/124.17 |
| 2008/0290623 A1 * | 11/2008 | Lundmark | B60G 3/20 280/124.152 |
| 2013/0099462 A1 * | 4/2013 | Ehrlich | B60G 21/051 280/124.116 |
| 2013/0231882 A1 * | 9/2013 | Yu | G01R 13/0236 702/67 |
| 2014/0353937 A1 | 12/2014 | Girelli Consolaro et al. | |

FOREIGN PATENT DOCUMENTS

| | | |
|---|---|---|
| DE | 10 2008 049 761 A1 | 4/2010 |
| DE | 10 2011 076 359 A1 | 11/2012 |
| DE | 10 2011 085 145 A1 | 4/2013 |
| EP | 0 083 182 B1 | 6/1987 |
| EP | 0 963 304 B1 | 9/2003 |
| EP | 1 378 382 B1 | 3/2006 |
| EP | 1 155 882 B1 | 5/2006 |
| WO | WO 2011/124814 A1 | 10/2011 |

OTHER PUBLICATIONS

Examination Report dated Oct. 21, 2014 issued in corresponding German application No. 10 2013 210 338.7.

* cited by examiner

WHEEL SUSPENSION AND AXLE INCLUDING WHEEL SUSPENSION FOR A MOTOR VEHICLE

CROSS REFERENCE TO RELATED APPLICATIONS

This application claims priority to German Application No. 10 2014 205 632.2, filed on Mar. 26, 2014, the contents of which is hereby incorporated by reference in its entirety.

TECHNICAL FIELD

The present disclosure relates to a single wheel suspension for a rear axle of a vehicle, rear axles including such wheel suspensions, and vehicles including such wheel suspensions and/or axles.

BACKGROUND

Vehicle wheels are typically secured to the structure of a vehicle via a front and/or rear axle. In such configurations, the axles contain axle components which can be moved relative to the structure and which, in combination with resilient damping elements, form the constituent components of an undercarriage.

Single wheel suspensions, such as for a rear axle of a vehicle, have been used to facilitate decoupling of forces transmitted from a ground surface to a wheel from a vehicle structure connected to the wheel via a single wheel suspension. Although such single wheel suspensions facilitate the decoupling of the forces, making for more comfortable and more stable rides, further advances in single wheel suspensions that provide improvements in weight savings for single wheel suspensions, provide additional improvement in ride comfort, and additional improvement in vehicle stability are desirable.

SUMMARY

In accordance with various exemplary embodiments, the present disclosure provides a single wheel suspension for a rear axle of a vehicle. The suspension comprises a transverse leaf spring, a damper, a wheel carrier, a transverse carrier link and a transverse camber link coupled to the wheel carrier in an articulated manner and configured to connect the wheel carrier to the vehicle, and a tie rod. The transverse camber link is arranged above the transverse carrier link. The tie rod connects the wheel carrier to the vehicle, either directly or via an auxiliary frame interposed between the tie rod and the wheel carrier. The transverse carrier link is coupled to the wheel carrier in an articulated manner by two connections. The transverse leaf spring is coupled in an articulated manner to one of the transverse carrier link, the transverse camber link, or the wheel carrier via a connection element that comprises a connection link.

In accordance with various exemplary embodiments, the present disclosure further provides a single wheel suspension for a rear axle of a vehicle. The suspension comprises a transverse leaf spring, a wheel carrier, and a transverse carrier link and a transverse camber link coupled to the wheel carrier in an articulated manner and configured to connect the wheel carrier to the vehicle. The transverse leaf spring is coupled in an articulated manner to one of the transverse carrier link, the transverse camber link, or the wheel carrier via a connection element interposed between the transverse leaf spring and the transverse carrier link, the transverse camber link, or the wheel carrier.

In accordance with various exemplary embodiments, the present disclosure further provides a single wheel suspension for a rear axle of a vehicle. The suspension comprises a transverse leaf spring, a wheel carrier, and first and second transverse links articulatably coupled to the wheel carrier. The transverse leaf spring is articulatably coupled to, and movable along a transverse direction of the vehicle relative to, one of the transverse links or the wheel carrier.

In accordance with various exemplary embodiments, the present disclosure further provides a rear axle for a vehicle. The rear axle comprises an auxiliary frame and a transverse leaf spring connecting first and second single wheel suspensions. Each suspension comprises a wheel carrier and first and second transverse links articulatably coupled to the wheel carrier. A respective end of the transverse leaf spring is articulatably coupled to one of the transverse carrier link, the transverse camber link, or the wheel carrier of each of the first and second suspensions.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the present disclosure are explained in detail below using an exemplary embodiment illustrated in the following figures. In the figures.

DESCRIPTION OF THE EMBODIMENTS

Figure 1:
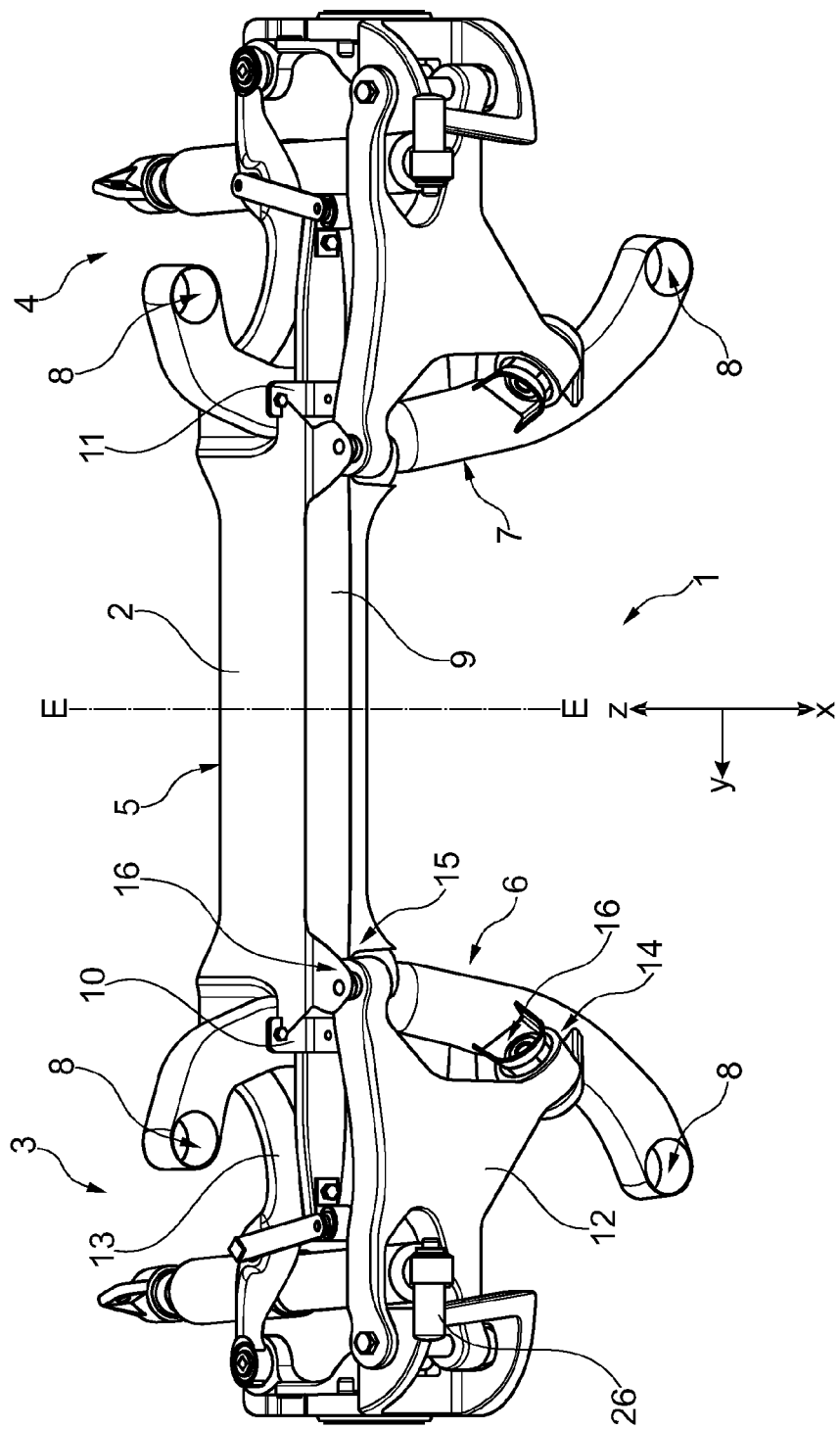
FIG. 1 is a perspective view of the lower side of a rear axle including single wheel suspensions, according to an exemplary embodiment.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In order to achieve the most extensive decoupling possible from the ground on which they are intended to travel, vehicle wheels are typically secured to the structure of a vehicle via a front and/or rear axle. In such configurations, the axles contain axle components which can be moved relative to the structure and which, in combination with resilient damping elements, form the constituent components of an undercarriage. In addition to the desired travel comfort, it is thus possible to ensure the necessary travel stability.

Rear axles may, for example, be constructed as rigid or semi-rigid axles such as, for example, floating axles or torsion beam axles. Other configurations provide for the use of single wheel suspensions that are substantially independent of each other. This means that a respective wheel is rotatably supported on a wheel carrier that in turn is movably articulated by means of a plurality of links. Such single wheel suspensions are then arranged at both sides of two-track vehicles.

The individual links may be either directly coupled to the structure of the vehicle or coupled to the vehicle structure via an auxiliary frame. Such auxiliary frames are typically called chassis subframes or axle carriers. The arrangement of auxiliary subframes affords the advantage of a prefabricated modular structure so that the final assembly requires only the securing of the front and/or rear axle module which is produced in this manner, using a small number of securing means. As a result of the interposition of resilient bearings, the transmission of vibrations and structure-borne noise into the interior of the vehicle can additionally be reduced to the greatest possible extent.

Although the wheels which face each other in single wheel suspensions are not, as in the conventional sense, arranged on a common structural transverse connection, the paired arrangement thereof is nonetheless conventionally referred to as a whole as a front or rear axle.

Compared with torsion beam axles, single wheel suspensions have the advantage of improved travel properties, which result from the wheel positions not influencing each other in the event of deflection and rebound. In addition, single wheel suspensions require a generally smaller structural space, which in turn affords the possibility of additional free space. The additional free space can be advantageously allocated, for example, to the inner and/or storage space of the vehicle.

Depending on the construction and installation position of the links, a distinction can be made between longitudinal, oblique and transverse links. The respective orientation thereof relates to the longitudinal direction or travel direction of the vehicle so that, for example, the transverse link extends substantially transversely relative to the longitudinal direction. The vehicle-side support of an individual link is carried out via at least one bushing, which may be constructed as a composite bearing, such as a rubber/metal bearing. The rubber portion facilitates adequate decoupling and limited movability of the link with respect to its support.

Rear axles and rear axle modules having single wheel suspensions may enable respective vehicle wheels to be articulated in a manner independent of each other. Together with shock absorbers and helical springs or, a transverse leaf spring, improved travel properties are thereby achieved, for example, compared with arrangements having a torsion beam axle.

When helical springs are used, separation of the helical spring from the associated shock absorber is preferred in a region of the rear axle. In contrast to a MacPherson strut, the helical spring and shock absorber are not arranged one inside the other, but instead spaced apart from each other. Structural space is required to accommodate such a configuration. Due to the exchange of the helical springs for a transverse leaf spring, the required structural space can be reduced. As a result, it is possible to produce wheel housings having a small construction, which has a positive effect on the storage space volume of a typical passenger vehicle having a front-mounted engine. Depending on the position and the associated configuration of the helical springs, replacement of helical springs with a transverse leaf spring may further enable a reduction of the weight.

Because the components of the respective single wheel suspension are connected to a helical spring or a transverse leaf spring as resilient elements, the components must have a corresponding level of strength, which can lead to an increase in weight. The reason for this is the introduction and transmission of forces out of and into the respective resilient element, which requires adequate rigidity. In addition, the arrangement of the individual components of such a single wheel suspension leaves room for improvement.

Against this background, an object of the present disclosure is to develop a single wheel suspension and a rear axle of a vehicle, in such a manner that, in addition to reduced weight, have an improved arrangement of their individual components. Furthermore, a vehicle equipped in a corresponding manner is also provided.

The present disclosure contemplates a single wheel suspension for a vehicle that is particularly suitable for a rear axle and accordingly as a component of a vehicle rear axle. According to an exemplary embodiment, the single wheel suspension may be combined with a front-wheel drive in a vehicle, such as a motor vehicle. Nonetheless, the various exemplary embodiments disclosed herein permit the combination with an additional or purely rear-wheel drive. The single wheel suspensions described herein can be arranged in pairs on a rear axle module, such as a rear axle.

The various exemplary embodiments described herein contemplate a single wheel suspension for a rear axle of a vehicle, rear axles including such wheel suspensions, and vehicles including such wheel suspensions and/or axles. A single wheel suspension may include a transverse leaf spring connected in an articulated manner to a transverse link or wheel carrier via a connection element. The connection element may be interposed between the transverse leaf spring and the transverse link or wheel carrier. The transverse link may be, for example, a transverse carrier link coupled to the wheel carrier or a transverse camber link coupled to the wheel carrier, such as via two connections. The transverse leaf spring may be coupled to the transverse link or wheel carrier so that the transverse leaf spring and the transverse link or wheel carrier, which the transverse leaf spring is coupled to, move relative to one another along a transverse direction of a vehicle. The location of a single component within a single wheel suspension and/or the weight of a single wheel suspension can impact the overall performance of such suspension. The arrangement of elements disclosed herein may improve spring ratio and lower forces acting on components of the suspension. Additionally, the arrangement may avoid weight increases and/or reduce weight of the suspension.

The terms "in front of" and "behind" used herein to define a relative position of one wheel suspension component relative to another. As used herein, "in front of" and "behind" relate to a relative arrangement of the wheel suspension components in the longitudinal direction of the vehicle or in a forward travel direction of the vehicle. For example, a wheel suspension component that is arranged in front of another component is located closer to the vehicle front than the other component. Similarly, the terms "forward" and "rearward" are used herein to describe a relative position of one wheel suspension component relative to another. As used herein, "forward" and "rearward" relate to a relative arrangement of the wheel suspension components in the longitudinal direction of the vehicle (i.e., a front or rear of the vehicle). These components may also be either "forward" or "rearward" in the longitudinal direction of the vehicle relative to a direction of travel of the vehicle. Thus, for example, when comparing components, the component that is advancing first in the direction of travel of the vehicle is the "forward" component and the component that is advancing after the first component, because of its relative position "behind" the first component in the direction of travel, is the "rearward" component.

In a similar manner, the terms "above" and "below" used herein relate to a positional description of two wheel suspension components relative to one another in a vertical direction of the vehicle. For example, a vehicle suspension component that is arranged below another component is located closer to a roadway plane of the vehicle than the component that is above it. Furthermore, the terms "inner" and "outer" refer to a relative position of the wheel suspension components in the transverse direction of the vehicle. For example, a wheel suspension component that is arranged inward relative to another (outer) wheel suspension component is located closer to a longitudinal center plane of the vehicle than the outer component.

In accordance with one aspect of the present disclosure, a single wheel suspension may include a wheel carrier connected to an auxiliary frame via transverse links connected to the wheel carrier in an articulated manner. A tie rod may be further coupled to the wheel carrier. The respective transverse links may include, for example, a carrier link and a camber link, which may be arranged above the carrier link with respect to a ground surface. According to an exemplary embodiment, the carrier link is connected to the wheel carrier via two connections. A transverse leaf spring is coupled, for example, in an articulated manner either to one of the transverse links or to the wheel carrier. The coupling of the leaf spring may be carried out with a connection element, such as a connection link or compliant member, which permits relative movement between the leaf spring and the transverse link or wheel carrier to which the leaf spring is coupled.

According to an exemplary embodiment of the present disclosure, a single wheel suspension has a transverse leaf spring, at least one damper, and a wheel carrier. The damper may be a shock absorber or other type of damper familiar to those having ordinary skill in the art. The transverse leaf spring acts as a resilient element to support the vehicle structure with respect to the non-suspended components of the vehicle undercarriage with respect to a ground surface. The damper and transverse leaf spring act together to minimize or prevent the uncontrolled rising and excursion of the vehicle structure when traveling over uneven surfaces.

A wheel carrier is provided to rotatably support a wheel and is connected in an articulated manner to transverse links and a tie rod, according to an exemplary embodiment. The transverse links may include, for example, a carrier link and a camber link arranged above the carrier link. The wheel carrier can thus be connected to the vehicle structure by means of the transverse links and the tie rod, directly or with an auxiliary frame being interposed between the wheel carrier and the vehicle structure.

According to an exemplary embodiment, the carrier link is connected to the wheel carrier by means of two connections. In other words, the wheel carrier is thereby supported at two regions of the carrier link. In such an embodiment, the transverse leaf spring can be coupled in an articulated manner either to the wheel carrier or to one of the transverse links. The articulated connection between the transverse leaf spring and the wheel carrier or one of the transverse links permits any relative, mutual movements that are possible between the transverse leaf spring and the wheel carrier or one of the transverse links. The transverse leaf spring can thus be coupled, for example, to the wheel carrier or the carrier link or the camber link. As used herein, the term "coupled" means, for example, that the transverse leaf spring is coupled to (or otherwise operatively associated with) the wheel carrier or one of the transverse links so as to transmit force.

The coupling of the transverse leaf spring to one of the transverse links or to the wheel carrier can be carried out with an additional connection element. According to an exemplary embodiment, the connection element includes at least one connection link. As a result of the use of a connection link, the transverse leaf spring and one of the transverse links, for example, the camber link, may be spaced apart from each other in such a manner that the available structural space is used in an optimal manner. Thus, directly adjacent positioning of the leaf spring and a link the leaf spring is connected to is not required because the force-transmitting connection is carried out via the connection link. The length of the connection link can be adapted to the respective circumstances in a simple manner. As a result of the use of the additional connection element, the possibility of lateral displacement (e.g., along a lateral or transverse direction of a vehicle) between the transverse leaf spring and the link the leaf spring is connected to in an articulated manner, by means of the connection element, is permitted while providing a connection between the link and the leaf spring in a simple manner.

The present disclosure contemplates single wheel suspensions having high lateral rigidity. Lateral rigidity can be defined as the force applied at a wheel (e.g., normally at a contact patch between a tire and a ground surface), perpendicular to a driving direction, needed to generate a displacement of the wheel itself. Lateral rigidity can be attributed to the arrangement and connection of the transverse links and the tie rod to the wheel carrier. As a result of the introduction of forces from the wheel carrier into the carrier link via at least two connections, a precise guiding of a respective wheel is achieved in spite of a simple structure. Additionally, decoupling of the carrier link and the tie rod permits a simplified construction of the tie rod. The tie rod can thereby be constructed to be slimmer, which can provide corresponding weight advantages.

As a result of the possible relative movements between the components connected to each other in an articulated manner from one of the transverse links or the wheel carrier and the transverse leaf spring, the contribution of the components to the rigidity of the single wheel suspension in the longitudinal direction is minimized. Longitudinal rigidity can be defined as the force applied at a wheel along a driving direction, either at a center of a wheel or at a contact patch between a tire and a ground surface, needed to generate a displacement of the wheel itself. In addition, the forces acting on the transverse leaf spring in the transverse direction and longitudinal direction of the vehicle are also reduced. According to an exemplary embodiment, the leaf spring has minimal or no influence on the lateral rigidity and/or longitudinal rigidity of a single wheel suspension.

According to an exemplary embodiment, the camber link is located above the carrier link and behind the wheel center. Consequently, the camber link can be connected, for example, to the same transverse carrier of an interposed auxiliary frame, as the carrier link. The lateral rigidity of the single wheel suspension is thereby increased. In addition, the steering error angle of the wheel which can be arranged on the wheel carrier is thereby reduced. In this manner, the steering angle of the wheel is decoupled to a greater extent from the camber angle thereof. This permits the static axis measurement and the adaptation of lateral steering without affecting camber. The same applies to the combination with an active rear wheel steering system, as another embodiment.

According to an exemplary embodiment, the transverse leaf spring is coupled to the camber link in an articulated manner. As a result of the coupling of the camber link to the transverse leaf spring, the carrier link and the tie rod can be adapted to the loads acting on them without loads from the transverse leaf spring being imposed. In this manner, the camber link and tie rod can be constructed so as to be substantially slimmer, which reduces the respective weight thereof accordingly. In another example, the camber link may be constructed so as to be correspondingly stronger in the direction of the loading via the transverse leaf spring, with the shape of the camber link being adapted to the prevailing loads. The transverse leaf spring can thus be arranged, for example, between the carrier link and the camber link so that the resilient force of the leaf spring is introduced into the camber links parallel with a vertical direction of the vehicle. In this instance, the camber link has a correspondingly strong axle about the longitudinal direction of the vehicle which is achieved, for example, by the structural height thereof.

At least one of the connections located between the wheel carrier and carrier link may include a guide bearing, according to an exemplary embodiment. Such guide bearings are also known as carrier bearings. These are, in most cases, formed by a ball and socket joint, which enables an articulated connection as well as a corresponding force transmission. Additionally or alternatively, at least one of these connections may be produced by means of a link. The link may be, for example, a coupling rod, and may be an integrated link. A link may be selected based on the possible spacing of the wheel carrier and carrier link, the distance thereof being bridged by the link.

According to another exemplary embodiment, the transverse leaf spring may have or be formed from a composite material. The composite material may include, for example, glass fibers embedded in a matrix of resin, such as epoxy resin, or other composite materials familiar to those having ordinary skill in the art, such as, for example, carbon fibers in a matrix (e.g., resin), carbon fibers in a matrix, metal wires in a matrix, or combinations of the various fibers and/or wires in a matrix. Further, thermoplastic polymers may be used as a matrix instead of a thermoset (e.g., resin) polymer. A composite material provides a substantial weight reduction in comparison to a transverse leaf spring made of metal. As a result of the high level of strength with respect to its weight, the transverse leaf spring may additionally be constructed in a correspondingly slim manner so that additional weight savings are thereby achieved.

The present disclosure contemplates various configurations for the tie rod. The tie rod may be arranged, for example, in the plane of the carrier link or outside the plane of the carrier link (e.g., above or below the plane of the carrier link and/or at an angle relative to the plane). A slim construction is thereby produced and, in the installed state, for example below the carrier link, permits a high degree of ground clearance. In another example, the tie rod may also be arranged below or above the carrier link. The location of the tie rod may be selected in view of, for example, configurations of the vehicle a wheel suspension is included as will be understood by one of skill in the art.

The above-described possible positions of the tie rod are not necessarily intended to be understood as a parallel orientation with respect to the carrier link. The terms "above" and "below" and "inside the plane of" the carrier link are instead intended to mean, for example, that the tie rod is arranged with over 50% of its dimensions above, below, or inside of the carrier link, respectively.

As a result of the construction of a single wheel suspension according to various exemplary embodiments described herein, an improved arrangement of the individual components thereof is achieved. At the same time, the individual components can be optimized in terms of their dimensions, so as to enable a reduction of their weight.

The present disclosure further relates to a rear axle that includes an auxiliary frame, a transverse leaf spring, and two single wheel suspensions. The single wheel suspensions may be a suspension configured according to the various exemplary embodiments described herein.

According to an exemplary embodiment, each of the single wheel suspensions has a wheel carrier connected to an auxiliary frame by means of transverse links, the transverse links being connected to the wheel carrier in an articulated manner, and a tie rod. The respective transverse links may include, for example, a carrier link and a camber link arranged above the carrier link. According to an exemplary embodiment, the respective carrier link is connected to the wheel carrier by means of two connections. The transverse leaf spring is coupled, for example, in an articulated manner either to one of the transverse links or to the wheel carrier. The coupling may be carried out with a connection element, such as a connection link or compliant member, which permits relative movement between the leaf spring and the transverse link or wheel carrier to which the leaf spring is coupled.

The resultant advantages and other configuration possibilities have already been explained in greater detail above in connection with a single wheel suspension in accordance with the present teachings. For this reason, reference is made to the previous explanations above. This also applies to the configuration possibilities set out below for the rear axle and for a vehicle according to the present disclosure, which comprises such a rear axle with two single wheel suspensions as described above.

According to an exemplary embodiment, the rear axle may have two leaf spring bearings spaced apart from each other. The leaf spring bearings are constructed to support the transverse leaf springs. The two leaf spring bearings may be arranged between the two single wheel suspensions on the auxiliary frame. The transverse leaf spring can thereby be supported on the auxiliary frame via the leaf spring bearings. Such a configuration may be made in view of the modular structure of vehicles so that the rear axle can be connected to the vehicle structure in a correspondingly pre-fabricated state.

As a result of the connection of the transverse leaf spring via the two leaf spring bearings, the leaf spring bends according to the 4-point bending theory of bending beams. In this manner, the transverse leaf spring can combine the properties of a conventional helical spring and a stabilizer. That is to say, an additional arrangement of a stabilizer, such as a stabilizer bar, may be included, such as to improve the travel properties, but is not required for the various exemplary embodiments described herein. The stabilizer may be arranged in order, for example, to provide an additional possibility for adjusting the rolling rigidity of the single wheel suspensions.

The transverse leaf spring may have a changeable or variable cross-section. The transverse leaf spring may thus have a cross-section which changes or varies over the extent thereof (e.g., along its longitudinal axis). The resilient rate (e.g., spring rate) and the rolling rate of the single wheel suspensions can thus be adjusted independently of each other via the respective form of the transverse leaf spring in spite of the arrangement of a single transverse leaf spring. According to an exemplary embodiment, the transverse leaf spring has, for example, a rectangular cross-section, although the present disclosure contemplates other cross-sectional shapes. For example, the cross-sectional shape of the leaf spring may be selected to adjust a specific behavior of the transverse leaf spring, as will be understood by those of skill in the art. In addition to varying the cross-sectional shape, the dimensions (e.g., height and/or width) of the cross-section of the leaf spring can be varied, such as along a longitudinal length of the leaf spring.

Turning now to the drawings, FIG. 1 depicts a lower view of an exemplary embodiment of a rear axle 1 for a motor vehicle. The rear axle 1 includes an auxiliary frame 2 that serves to connect two opposing single wheel suspensions 3, 4, according to an exemplary embodiment. When viewing the illustration of FIG. 1, single wheel suspension 3 is a left wheel suspension and single wheel suspension 4 is a right wheel suspension. The auxiliary frame 2 comprises a transverse carrier 5 which extends perpendicularly relative to a longitudinal direction x, such as along a transverse direction y. The two ends of the transverse carrier 5 are adjoined, for example, by a left longitudinal carrier 6 and correspondingly a right longitudinal carrier 7. In this instance, the left transverse carrier 6 is located in the region of the left single wheel suspension 3 whilst the right longitudinal carrier 7 is located accordingly in the region of the right single wheel suspension 4. The transverse carrier 5 and the longitudinal carriers 6, 7 are connected to each other in an appropriate manner not shown in greater detail, such as, for example, via welding or other connection means familiar to those having ordinary skill in the art.

The longitudinal carriers 6, 7 of the auxiliary frame 2 have at the respective ends thereof connection regions 8 via which the entire rear axle 1 can be connected to the structure of a vehicle, which are not illustrated in detail but familiar to those having ordinary skill in the art. The connection regions 8 are constructed, for example, as openings which can be used, for example, to receive resilient rubber/metal bearings, which are not illustrated in the drawings.

According to an exemplary embodiment, a leaf spring 9 extends below the auxiliary frame 2, such as along a direction parallel with the transverse carrier 5 between the two single wheel suspensions 3, 4. A left leaf spring bearing 10 and a right leaf spring bearing 11 can be arranged, for example, on the auxiliary frame 2 so as to be spaced apart from each other. In this arrangement, the two leaf spring bearings 10, 11 may be secured to the auxiliary frame 2 by releasable connection means. Via the two leaf spring bearings 10, 11 the transverse leaf spring 9 is accordingly supported on the auxiliary frame 2 at two regions thereof.

According to an exemplary embodiment, the two single wheel suspensions 3, 4 are constructed in an identical manner in so far as they are reflected at a mirror plane E defined between the longitudinal direction x and a vertical direction z. In view of this, statements made herein relating to the structure of a single wheel suspension (e.g., single wheel suspensions 3, 4) are carried out with reference to the left single wheel suspension 3, which is illustrated on the left in FIG. 1, but accordingly also apply to the right single wheel suspension 4. Therefore, for the sake of clarity, a single wheel suspension 3, 4 will be referred to below in various statements that will apply to both single wheel suspensions 3, 4.

A respective single wheel suspension 3, 4 comprises two transverse links 12, 13, such as, for example, a carrier link 12 and a camber link 13, according to an exemplary embodiment. The carrier link 12 can be arranged at the bottom on the auxiliary frame 2 with respect to the vertical direction z, whilst the camber link 13 can be arranged at the top on the auxiliary frame 2. The carrier link 12 can have a substantially H-shaped base member. According to an exemplary embodiment, the carrier link 12 is connected to the auxiliary frame 2 in an articulated manner by means of two inner bearing arrangements 14, 15. The inner bearing arrangements 14, 15 may be rubber/metal bearings. According to an exemplary embodiment, the auxiliary frame 2 has cantilever arms 16 arranged both in the region of the left and in the region of the right single wheel suspensions 3, 4. A cantilever arm 16 can be integral component of one of the bearing arrangements 14, 15, according to an exemplary embodiment. As depicted in the exemplary embodiment of FIG. 1, the carrier links 12 can be arranged partially between two of the cantilever arms 16 and secured thereto in an articulated manner, such as via a shaft.

Figure 2:
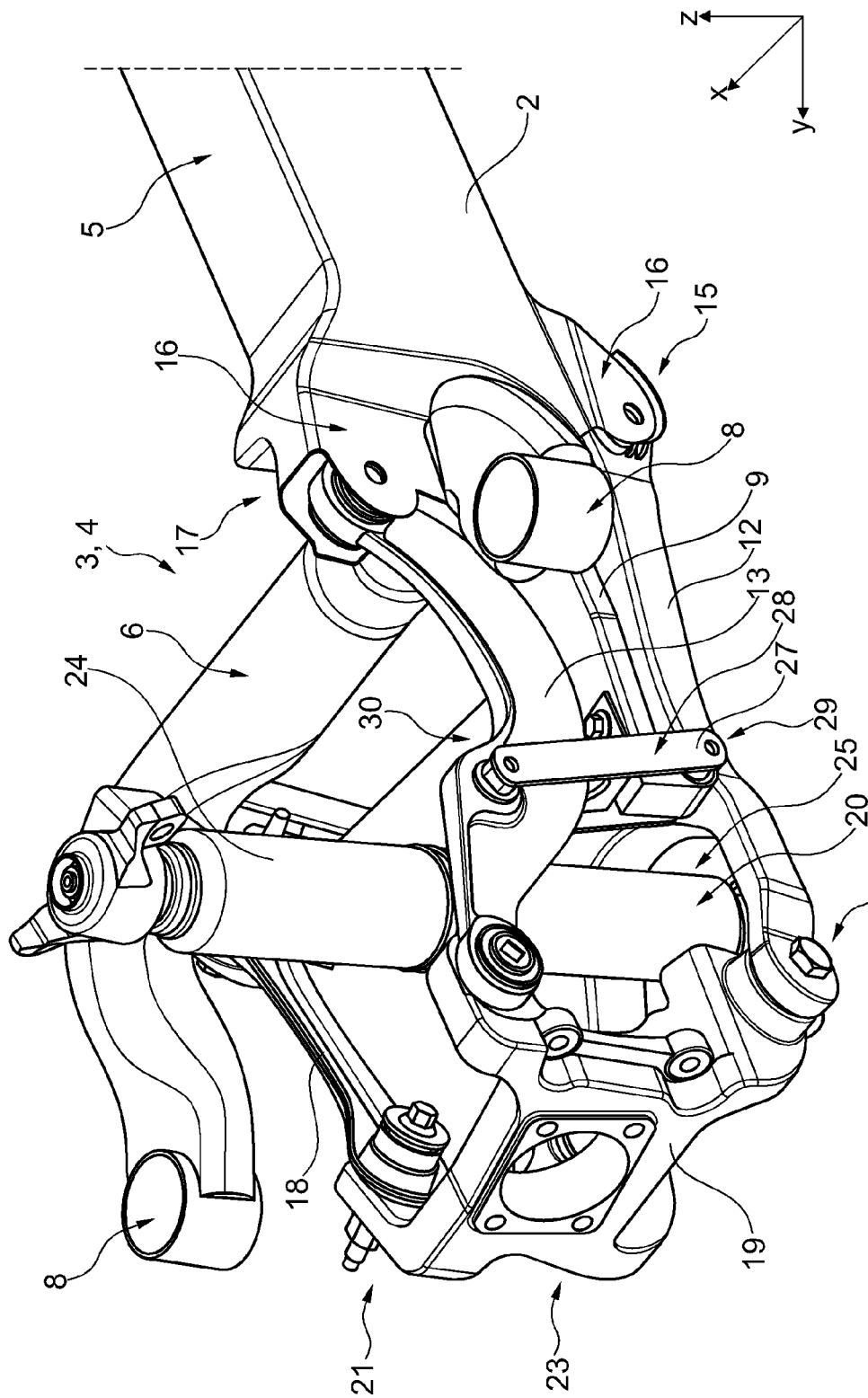
FIG. 2 is a perspective side view of a one of the single wheel suspensions of FIG. 1.

For further clarification, reference is now made to FIG. 2, which shows the left single wheel suspension 3 from FIG. 1 in greater detail. To this end, the perspective view has been changed to such an extent that the perspective view is now directed toward a first side of the single wheel suspension 3. A portion of the auxiliary frame 2 on which the single wheel suspension 3 is arranged can also further be seen in FIG. 2. FIG. 2 shows that the camber link 13 can be connected to the auxiliary frame 2 in an articulated manner by means of a bearing arrangement 17. The bearing arrangement 1 can be, for example, a rubber/metal bearing. Corresponding cantilever arms 16 are also provided, between which the camber link 13 is received and is secured to in an articulated manner, such as via a shaft.

According to an exemplary embodiment, arranged opposite the camber link 13, such as along the longitudinal direction x, is a tie rod 18, which can extend substantially in a transverse direction y. The tie rod 18 can be arranged above a plane of the carrier link 12. In other examples, the tie rod 18 may be arranged in the plane of the carrier link 12 or below the carrier link 12. The carrier link 12 and the camber link 13 and the tie rod 18 serve to articulate a wheel carrier 19. In this regard, the wheel carrier 19 can be connected to the structure of a vehicle, which is not shown in greater detail, by means of the transverse links connected to the wheel carrier 19 in an articulated manner, such as via the carrier link 12, the camber link 13, and/or the tie rod 18, with the auxiliary frame 2 being interposed between the vehicle structure and the wheel carrier 19. The wheel carrier 19 serves to rotatably support a wheel, which is not depicted in the drawings. To this end, the wheel carrier 19 is connected in an articulated manner by means of additional bearing arrangements 20, 21, both to the camber link 13 and to the tie rod 18. The bearing arrangements 20, 21 may be or include rubber/metal bearings.

Figure 3:
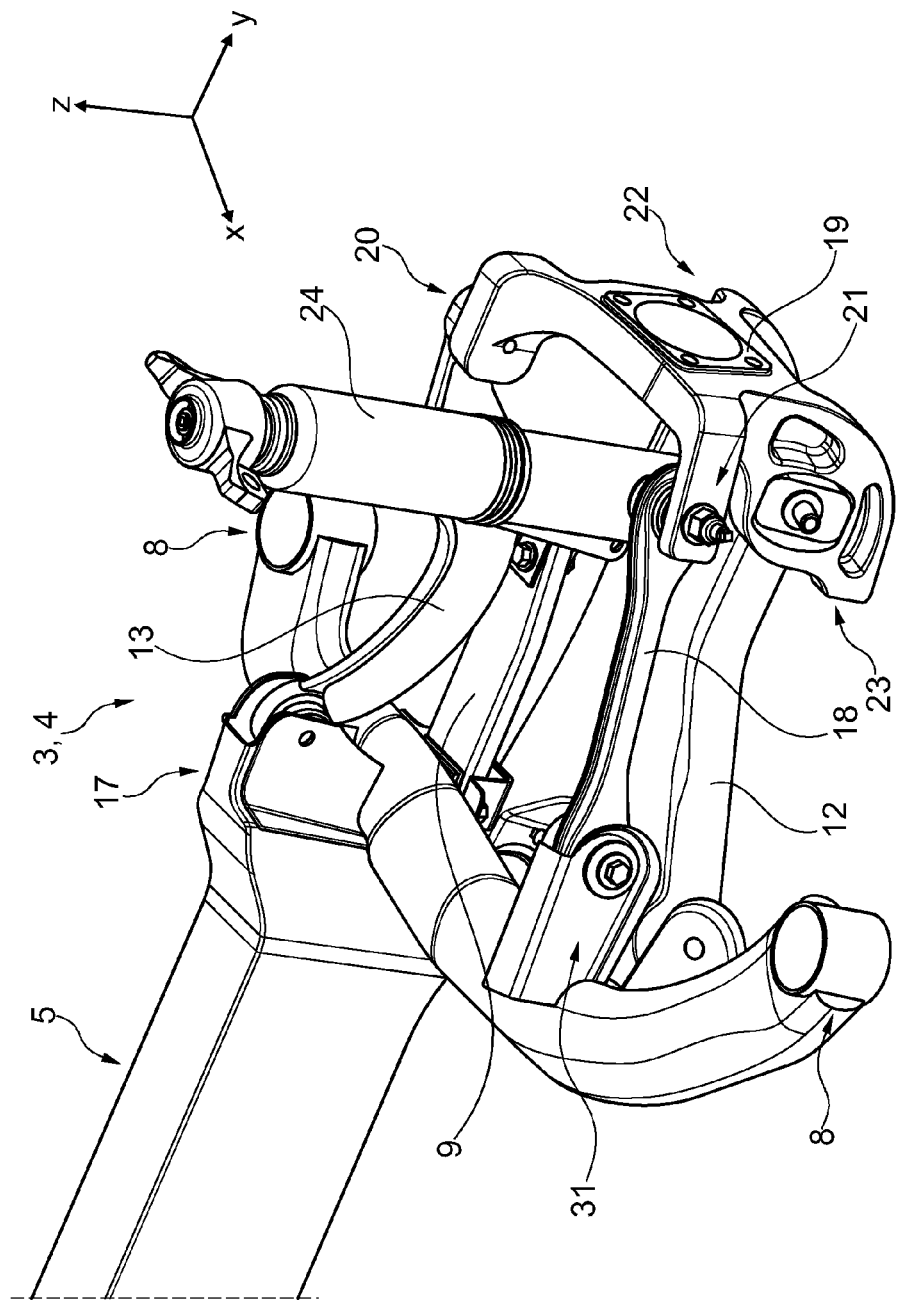
FIG. 3 is a second perspective side view of the single wheel suspension of FIG. 2.

According to an exemplary embodiment, the carrier link 12 is connected to the wheel carrier 19 in an articulated manner by means of two connections 22, 23. The first connection 22 can be seen clearly in FIG. 2, whilst the second connection 23 is concealed in FIG. 2 but depicted in FIG. 3. As depicted in FIGS. 2 and 3, the two connections 22, 23 provide direct, articulated connections between the carrier link 12 and the wheel carrier 19, without any intervening members, such as without a link interposed between the carrier link 12 and the wheel carrier 19. The two connections 22, 23 for connecting the carrier link 12 to the wheel carrier 19 are produced by means of, for example, additional bearing arrangements, which may comprise rubber/metal bearings. According to another exemplary embodiment, the carrier link 12 can be connected to the wheel carrier 19 via at least one link (e.g., an additional link), which is not shown in the drawings.

The single wheel suspension 3 further comprises a damper 24, according to an exemplary embodiment, which may be a shock absorber extending substantially in a vertical direction z. The damper 24 is provided to support the wheel carrier 19 on a structure of the vehicle, which is not shown in the drawings. To this end, the damper 24 first extends through an opening 25 of the carrier link 12. The opening may be formed by the H-shape of the carrier link 12 and connected to the wheel carrier 19 at the lower end thereof. The connection of the damper 24 to the wheel carrier 19 may be carried out by means of a bearing axle 26, which can be seen in FIG. 1 and which can be arranged on the wheel carrier 19. According to an exemplary embodiment, the bearing axle is a materially integral, single-piece component of the wheel carrier 19.

According to an exemplary embodiment, the transverse leaf spring 9 is coupled to one of the transverse links 12, 13 in an articulated manner, such as to the camber link 13. The coupling may be carried out via a connection element 27, which may comprise a connection link 28. As depicted in FIG. 2, the connection element 27 is connected in an articulated manner to an end portion of the transverse leaf spring 9 at a lower end 29 of the connection element 27. According to an exemplary embodiment, an upper end 30 of the connection element 27 opposite the lower end 29 may be connected in an articulated manner to the camber link 13, such as between the two bearing arrangements 17, 20 of the camber link 13. According to another exemplary embodiment, the connection element 27 may connect the leaf spring 9 to the carrier link 12 or the wheel carrier 19.

Owing to the position of the connection of the connection element 27 to the camber link 13, the resulting lever arm and the associated forces of the transverse leaf spring 9 can be adjusted accordingly. Further, coupling of the leaf spring 9 to the camber link 13, the carrier link 12, or the wheel carrier 19 via the connection element 27 permits relative movement between the leaf spring 9 and the camber link 13, the carrier link 12, or the wheel carrier 19. For example, the end of the leaf spring 9 connected to the connection element 27 and a portion or end of the camber link 13, the carrier link 12, or the wheel carrier 19 that is connected to the connection element 27 may move relative to one another.

Although the connection element 27 has been described as comprising a connection link 28 for coupling the leaf spring 9 to one of the transverse links 12, 13 or wheel carrier 19, other connection elements may be used to couple the leaf spring to one of these components. For example, the connection element 27 may comprise one or more compliant elements, such as, for example, bushings, rubber cushions, shear pads, and other compliant elements familiar to one of ordinary skill in the art.

Figure 4:
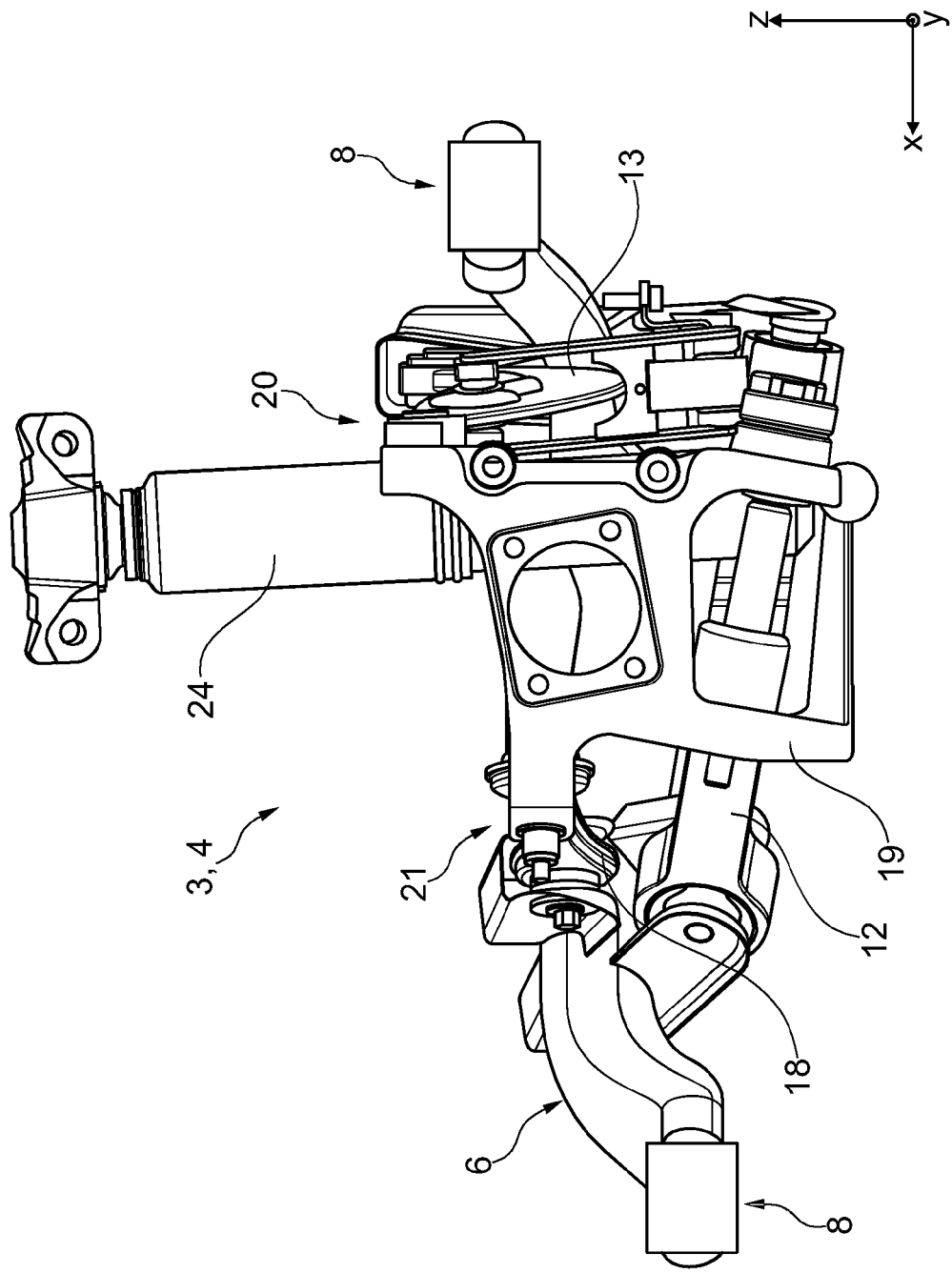
FIG. 4 is a perspective view of the single wheel suspension of FIG. 2 along a longitudinal direction of a rear axle.

The single wheel suspension 3, which represents both single wheel suspensions 3, 4, is further depicted with different perspectives in FIGS. 3 and 4. FIG. 3 depicts the single wheel suspension 3 via a second perspective side view to show that the end of the tie rod 18 opposite the wheel carrier 19 may also be connected to the auxiliary frame in an articulated manner, such as by means of a bearing arrangement 31 and to the left longitudinal carrier 6. Bearing arrangement 31 may be constructed as, or include, a rubber/metal bearing, according to an exemplary embodiment.

FIG. 4 is another view of the single wheel suspension 3 in the transverse direction y. From this view, it is possible to see the vertical position above the carrier link 12 and the spacing of the tie rod 18 from the camber link 13.

Further modifications and alternative embodiments will be apparent to those of ordinary skill in the art in view of the disclosure herein. For example, the systems and the methods may include additional components or steps that were omitted from the diagrams and description for clarity of operation. It should be noted that the features set out individually in the present disclosure can be combined with each other in any technically advantageous manner and provide other embodiments. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed:

1. A single wheel suspension for a rear axle of a vehicle, comprising:
    a transverse leaf spring;
    a damper;
    a wheel carrier; and
    a transverse carrier link and a transverse camber link coupled to the wheel carrier in an articulated manner and configured to connect the wheel carrier to the vehicle, wherein the transverse camber link is arranged above the transverse carrier link; and
    a tie rod connecting the wheel carrier to the vehicle, either directly or via an auxiliary frame interposed between the tie rod and the wheel carrier, the tie rod being positioned forward of the transverse camber link in a direction of travel of the vehicle,
    wherein the transverse leaf spring is coupled in an articulated manner to one of the transverse carrier link, the transverse camber link, or the wheel carrier via a connection link comprising first and second opposite ends, the first end of the connection link being directly connected to the transverse leaf spring and the second end of the connection link being directly connected to the one of the transverse carrier link, the transverse camber link, or the wheel carrier.

2. The suspension of claim 1, wherein the transverse leaf spring comprises a composite material or is made of a composite material.

3. The suspension of claim 1, wherein the tie rod extends either inside a plane of the transverse carrier link or outside the plane of the transverse carrier link.

4. A rear axle for a vehicle, the axle comprising:
    an auxiliary frame;
    the transverse leaf spring; and
    two single wheel suspensions, each single wheel suspension being arranged according to claim 1.

5. The rear axle of claim 4, further comprising two leaf spring bearings spaced apart from one another and arranged between the two single wheel suspensions on the auxiliary frame, wherein the transverse leaf spring is supported on the auxiliary frame by the leaf spring bearings.

6. The rear axle of claim 4, wherein the transverse leaf spring has a cross-section that changes over a longitudinal extent of the transverse leaf spring.

7. A vehicle comprising a rear axle including two single wheel suspensions, wherein each single wheel suspension is arranged as claimed in claim 1.

8. The suspension of claim 1, wherein the transverse leaf spring is coupled in the articulated manner to the transverse camber link via the connection link, and wherein the connection link extends between the transverse leaf spring and the transverse camber link in a direction that is substantially perpendicular to a transverse direction of the vehicle.

9. The suspension of claim 1, wherein the transverse carrier link is coupled to the wheel carrier in an articulated manner by two connections.

10. A single wheel suspension for a rear axle of a vehicle, comprising:
    a transverse leaf spring;
    a wheel carrier; and
    first and second transverse links articulatably coupled to the wheel carrier, the first transverse link being coupled to the wheel carrier by two connections,
    wherein the transverse leaf spring is articulatably coupled to, and movable along a transverse direction of the vehicle relative to, one of the transverse links or the wheel carrier.

11. The suspension of claim 10, wherein a cross-section of the leaf spring varies along a length thereof.

12. The suspension of claim 10, further comprising a connection element coupling the transverse leaf spring to the one of the transverse links or the wheel carrier, the connection element comprising a first end connected directly to the transverse leaf spring and a second end, opposite the first end, connected directly to the one of the transverse links or the wheel carrier.

13. The suspension of claim 10, wherein the transverse leaf spring is made of a composite material.

14. The suspension of claim 10, wherein the first transverse link is directly coupled to the wheel carrier in the articulated manner.

15. The suspension of claim 10 wherein the first transverse link is a carrier link and the second transverse link is a camber link, wherein the camber link is positioned above the carrier link.

16. The suspension of claim 15, further comprising a tie rod positioned forward of the camber link in a direction of travel of the vehicle.

17. The suspension of claim 16, further comprising a damper positioned between the tie rod and the camber link.

18. A rear axle for a vehicle, comprising:
    an auxiliary frame;
    a transverse leaf spring connecting first and second single wheel suspensions;
    and
    two leaf spring bearings spaced apart from one another and arranged between the first and second single wheel suspensions on the auxiliary frame,
    wherein the transverse leaf spring is supported on the auxiliary frame by the leaf spring bearings, and
    wherein each single wheel suspension comprises:
        a wheel carrier;
        first and second transverse links articulatably coupled to the wheel carrier; and
        a connection element articulatably coupling the transverse leaf spring to one of the transverse links or the wheel carrier, the connection element comprising a first end connected directly to the transverse leaf spring and a second end, opposite the first end, connected directly to the one of the transverse links or the wheel carrier.

* * * * *